(12) United States Patent
Brotherton

(10) Patent No.: US 7,798,575 B1
(45) Date of Patent: Sep. 21, 2010

(54) HUB AND DRUM ASSEMBLY INCLUDING RECESSED SHIPPING NUT

(75) Inventor: Joseph A. Brotherton, Portland, OR (US)

(73) Assignee: KIC Holdings, Inc., Vancouver, WA (US)

( * ) Notice: Subject to any disclaimer, the term of this patent is extended or adjusted under 35 U.S.C. 154(b) by 253 days.

(21) Appl. No.: 11/943,324

(22) Filed: Nov. 20, 2007

Related U.S. Application Data

(60) Provisional application No. 60/869,300, filed on Dec. 8, 2006.

(51) Int. Cl.
*B60B 3/16* (2006.01)

(52) U.S. Cl. ............... 301/6.1; 301/35.621; 301/105.1; 188/18 R

(58) Field of Classification Search ................ 301/6.1, 301/6.6, 35.621, 35.622, 35.623, 35.626, 301/35.627, 35.628, 36.1, 105.1, 6.7; 188/17, 188/18 R, 26
See application file for complete search history.

(56) References Cited

U.S. PATENT DOCUMENTS

| | | | | |
|---|---|---|---|---|
| 693,011 | A * | 2/1902 | Hawk ........................... 301/58 |
| 1,635,894 | A * | 7/1927 | Michelin ................ 301/35.628 |
| 1,721,313 | A * | 7/1929 | Nelson .................. 301/35.628 |
| 1,914,575 | A * | 6/1933 | Main ..................... 301/35.621 |
| 1,963,229 | A * | 6/1934 | Eksergian .................. 301/36.1 |
| 1,969,193 | A * | 8/1934 | Woodward ............. 301/35.628 |
| 2,058,640 | A * | 10/1936 | Simpson ..................... 192/62 |
| 2,481,187 | A * | 9/1949 | Ash ....................... 301/64.101 |
| 3,102,758 | A * | 9/1963 | Holmes, Jr. ............... 301/35.63 |
| 3,295,636 | A * | 1/1967 | Adams ..................... 188/18 R |
| 4,632,464 | A * | 12/1986 | Okamoto et al. ........... 301/11.1 |
| 5,884,980 | A * | 3/1999 | Visser et al. ................. 301/6.1 |
| 6,247,219 | B1 * | 6/2001 | Austin et al. .................. 29/434 |
| 6,340,210 | B1 * | 1/2002 | Handa et al. ........... 301/64.303 |
| 2003/0066215 | A1 * | 4/2003 | Grant .......................... 37/446 |

\* cited by examiner

*Primary Examiner*—Russell D Stormer
(74) *Attorney, Agent, or Firm*—Marger Johnson & McCollom, P.C.

(57) ABSTRACT

A hub and drum assembly includes a recess around one or more stud holes in the drum and a shipping nut threaded onto a stud and contained in the recess. The recessed shipping nut securely fastens the hub to the drum during shipping. At a destination facility, the shipping nut does not have to be removed before wheels are installed on the huh and drum assembly. A method of assembling a portion of a drive train including a hub and drum assembly with a recessed shipping nut is also provided.

15 Claims, 10 Drawing Sheets

US 7,798,575 B1

HUB AND DRUM ASSEMBLY INCLUDING RECESSED SHIPPING NUT

RELATED APPLICATION DATA

This application claims the benefit of U.S. provisional patent application Ser. No. 60/869,300 filed Dec. 8, 2006, herein incorporated by reference.

BACKGROUND

1. Technical Field

The disclosure relates to a hub and drum assembly for a motor vehicle such as a tractor-trailer. Specifically, the disclosure relates to use of a shipping nut on the hub and drum assembly.

2. Description of the Related Art

Large motor vehicles and trailers, such as those used for shipping goods, contain hub and drum assemblies as part of their drive train. A typical drive train portion may include an axle, a spindle on the axle, a hub and drum assembly mounted on the spindle, and a wheel mounted on the hub and drum assembly. In some applications, there may be two wheels, an inner dual wheel and an outer dual wheel, mounted to a single hub and drum assembly. Flange nuts are generally used to mount the wheel or wheels to the hub and drum assembly, which usually includes studs for this purpose. For instance, a hub and drum assembly may have ten studs, over which the wheel will be placed and then secured by ten flange nuts. When two wheels are used, both wheels may be attached to the hub and drum assembly using only studs and flange nuts, or a system of studs, inner cap nuts, and outer cap nuts may be used. FIGS. 1 and 2 illustrate two different types of drive train portions.

FIG. 1 is an exploded view of a portion of a drive train assembled with flange nuts. Referring to FIG. 1, a portion of a drive train 10 may include a hub and drum assembly 11, an inner dual wheel 12, an outer dual wheel 13, and a plurality of flange nuts 14. The hub and drum assembly 11 includes a plurality of studs 15. When the drive train portion 10 is assembled, machined surfaces of the hub and drum assembly 11, the inner dual wheel 12, and the outer dual wheel 13 are brought into contact. Then the flange nuts 14 are threaded onto the studs 15 in order to secure all of the components in place relative to each other. It is critical that all of the components of the drive train portion 10 be correctly aligned with respect to each other in order to prevent excessive vibration and wear during operation.

FIG. 2 is an exploded view of a portion of a drive train assembled with inner and outer cap nuts. Referring to FIG. 2, a portion of a drive train 20 may include a hub and drum assembly 21, an inner dual wheel 22, an outer dual wheel 23, a plurality of inner cap nuts 26, and a plurality of outer cap nuts 27. The hub and drum assembly 21 includes a plurality of studs 25. Once again, when the drive train portion 20 is assembled, machined surfaces of the hub and drum assembly 21, the inner dual wheel 22, and the outer dual wheel 23 are brought into contact. Then the inner cap nuts 26, the outer cap nuts 27, and the studs 25 are threaded together in order to secure all of the components in place relative to each other. In this assembly it is also critical that all of the components of the drive train portion 20 be correctly aligned with respect to each other in order to prevent excessive vibration and wear during operation.

It is often the case that the hub and drum assembly is manufactured at one location, or by one manufacturer, and is then shipped to a second location and/or manufacturer to be assembled with some or all of the remaining drive train components. As the name suggests, the hub and drum assembly consists of two components; the hub and the drum. The hub and the drum are precisely machined to fit together such that the resulting assembly does not have excessive wear or vibration during operation. The hub and the drum are typically assembled together for shipping using two or more flange nuts. The hub and drum assembly is then shipped to another location and/or manufacturer as indicated above. Upon arrival at the second location, the shipping flange nuts have to be removed so that the wheel or wheels can be installed on the hub and drum assembly. This disassembly and reassembly of the hub and drum assembly can cause several problems. For instance, disassembling the hub and drum assembly, only to reassemble it again with the wheel exacts undesired labor costs. Plus, if the shipping nuts are not reused for installing the wheel, there is an unrecovered materials cost. The discarded shipping nuts can lead to workplace hazards if they are not disposed of properly. For example, loose shipping nuts may end up on the floor, presenting trip hazards for workers. Finally, if the hub and drum are not reassembled correctly when the wheel is installed, the resulting drive train may have excessive wear or vibration, leading to premature failure and hazardous conditions for the operator of the motor vehicle and other drivers on the road. Consequently, a hub and drum assembly that is stable during shipment but that does not have to be disassembled in order to install the wheel or wheels is desired.

SUMMARY

The disclosure provides a hub and drum assembly with a recessed portion, within which a thin shipping nut can be installed and need not be removed to mount wheels. A method of preparing a hub and drum assembly for shipment is also provided. The shipping nut installed in the recess provides labor, safety, and material savings over the conventional approach.

BRIEF DESCRIPTION OF THE DRAWINGS

The above and other objects, features and advantages of the disclosure will be more clearly understood from the following detailed description taken in conjunction with the accompanying drawings, in which.

DETAILED DESCRIPTION

Figure 1:
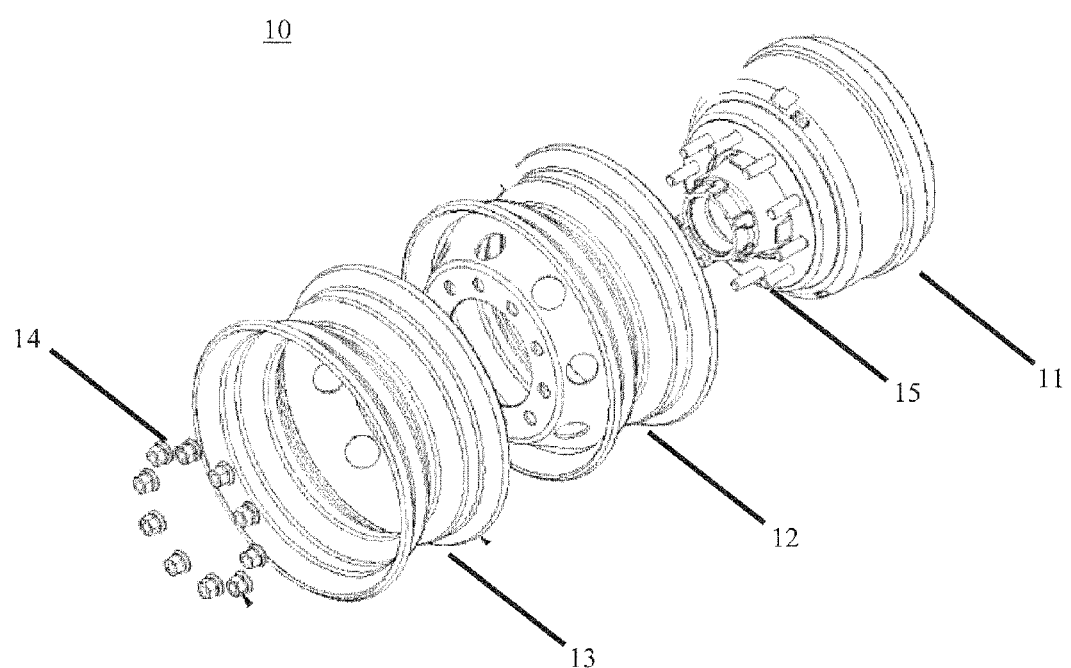
FIG. 1 is an exploded view of a portion of a drive train assembled with flange nuts.
Figure 2:
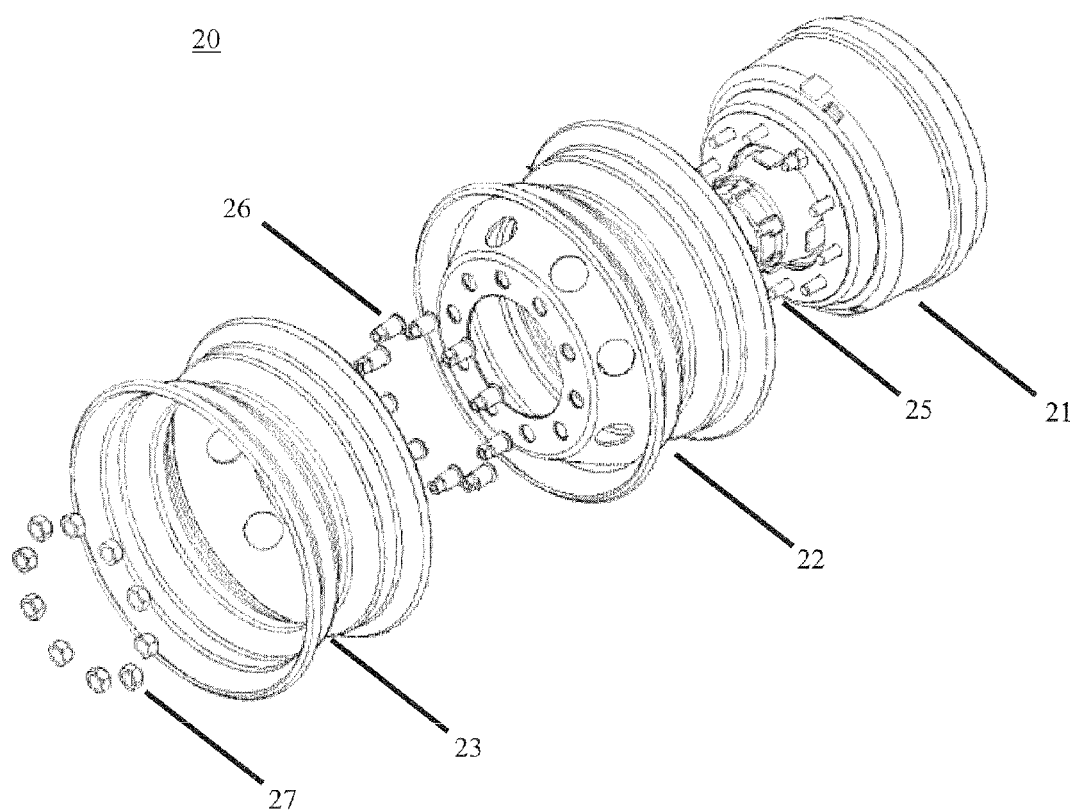
FIG. 2 is an exploded view of a portion of a drive train assembled with inner and outer cap nuts.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
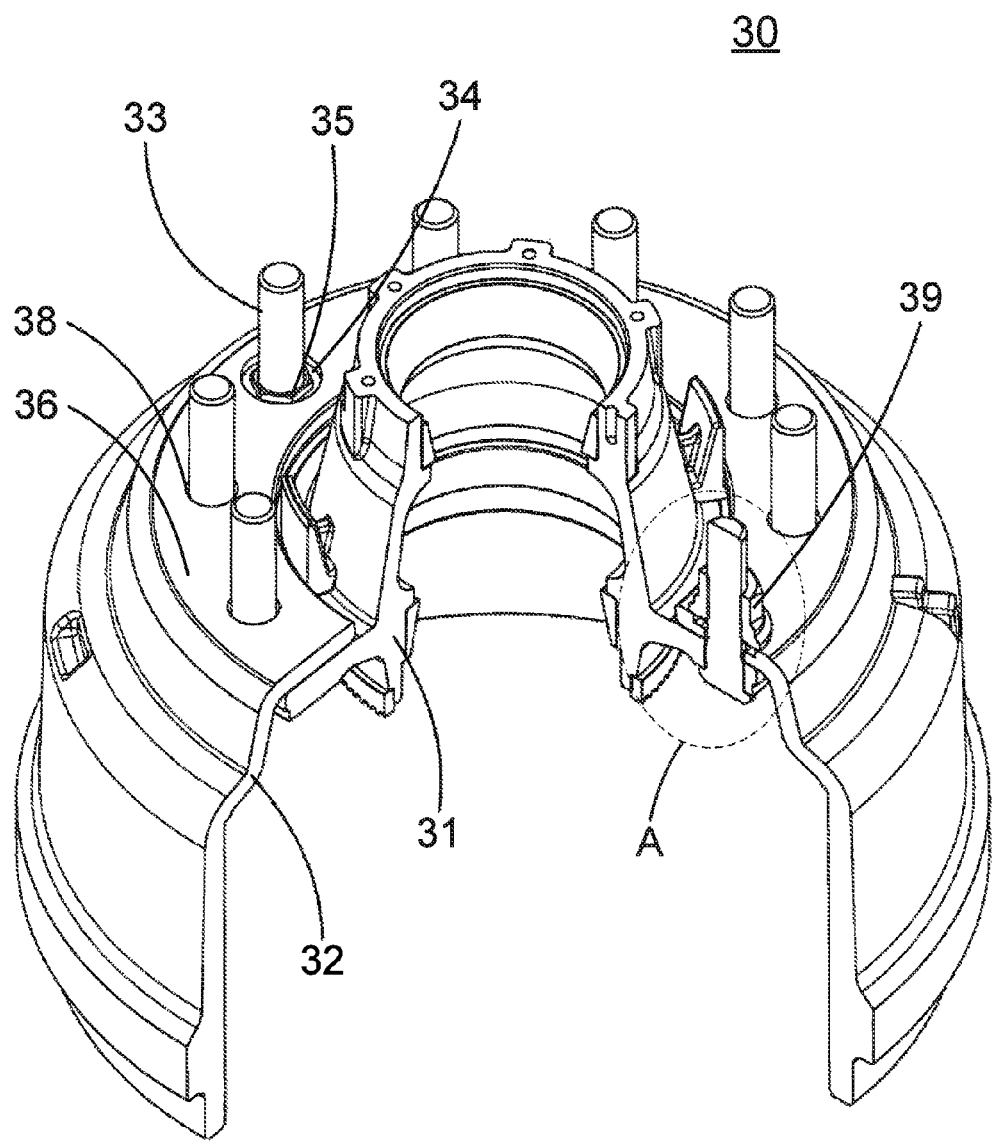
FIG. 3 is a cutaway perspective view of a hub and drum assembly according to an embodiment of the invention.

FIG. 3 is a cutaway perspective view of a hub and drum assembly according to an embodiment of the invention.

Referring to FIG. 3, a hub and drum assembly 30 includes a hub 31, a drum 32, studs 33, a recessed portion 34, and a shipping nut 35. The hub 31 and the drum 32 include precisely machined surfaces where the components contact each other when assembled. The drum 32 also includes a machined wheel mating surface 36 and stud holes 38. The studs 33 are inserted through the stud holes 38 in the drum 32 and corresponding holes in the hub 31. The recessed portion 34 surrounds one of the stud holes 38 in the drum 32 through which a stud 33 is inserted. The recessed portion 34 has a sidewall and a bottom surface. A shipping nut 35 is threaded onto the stud 33, thereby holding the hub 31 and drum 32 together. The shipping nut 35 is spaced apart from the sidewall of the recessed portion 34. The recessed portion 34 may be referred to as a counterbore. The depth of the recessed portion 34 is greater than the thickness of the shipping nut 35. Consequently, the shipping nut 35 fits within the recessed portion 34 such that the shipping nut 35 does not extend above the wheel mating surface 36 of the drum 32. FIG. 3 also illustrates a flange nut 39. The flange nut 39 is not part of the hub and drum assembly 30, but is included to illustrate how a flange nut 39 could be installed on a stud 33, over the shipping nut 35 seated in the recessed portion 34, such that the flange nut 39 seats against the wheel mating surface 36 despite the presence of the shipping nut 35. This illustrates that the shipping nut 35 does not extend above the wheel mating surface 36, so that a wheel (not shown) could be subsequently placed on the hub and drum assembly 30 and seat securely on the wheel mating surface 36, unobstructed by the shipping nut 35.

Figure 4:
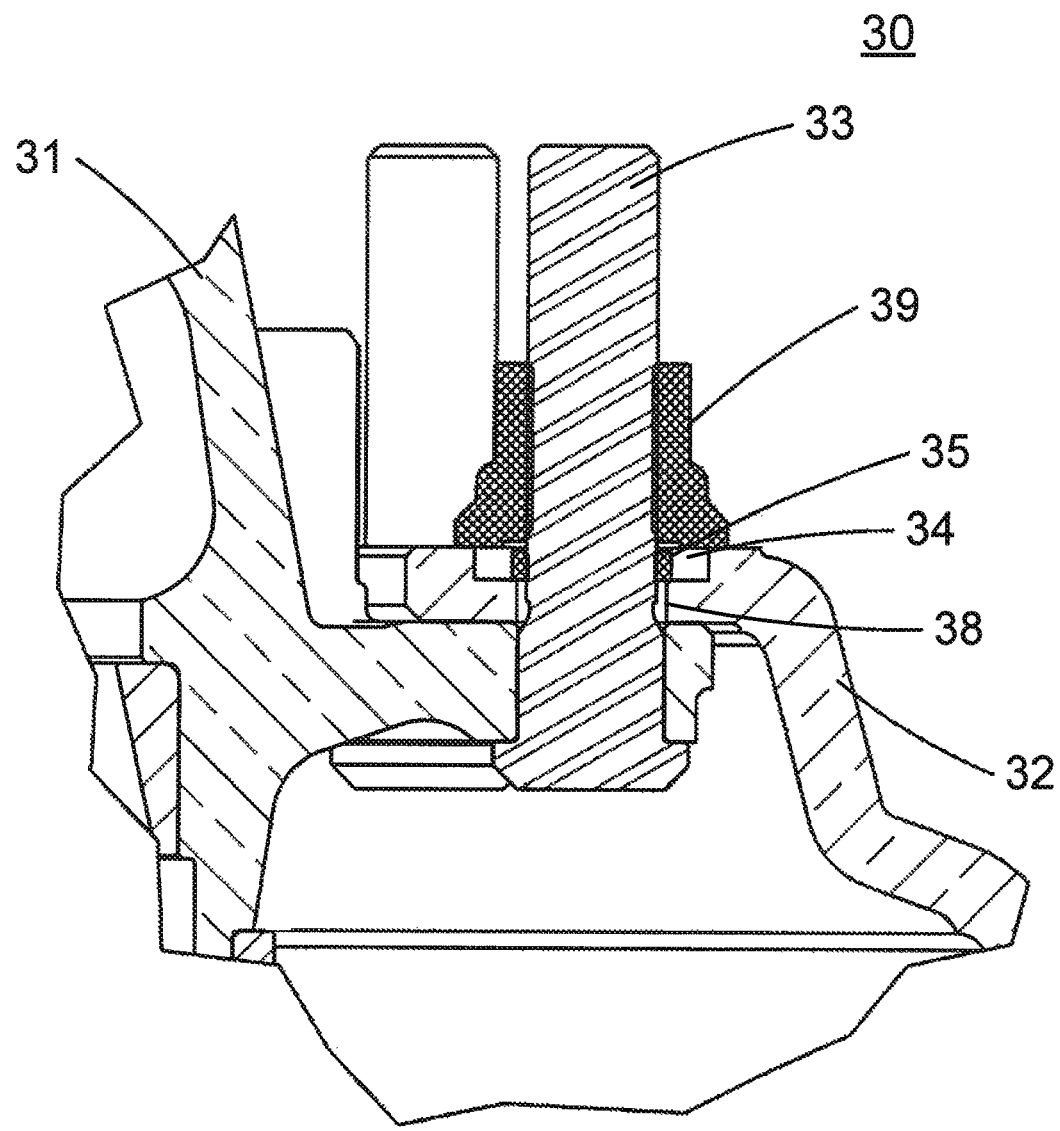
FIG. 4 is an enlarged cross-sectional view of the hub and drum assembly of FIG. 3.

FIG. 4 is an enlarged cross-sectional view of the hub and drum assembly of FIG. 3.

Referring to FIG. 4, a hub and drum assembly 30 includes a hub 31, a drum 32, a stud 33, a recessed portion 34, and a shipping nut 35. As shown in the figure, when the shipping nut 35 is fully threaded onto the stud 33, the hub 31 and drum 32 are seated together and held firmly in place with respect to each other. Further, the shipping nut 35 does not extend above the recessed portion 34, so that a wheel can be subsequently placed on the hub and drum assembly 30 without being obstructed by the shipping nut 35. For example, the depth of the recessed portion 34 or counterbore may be about 5.5 mm and the thickness of the shipping nut 35 may be about 5 mm.

Figure 5:
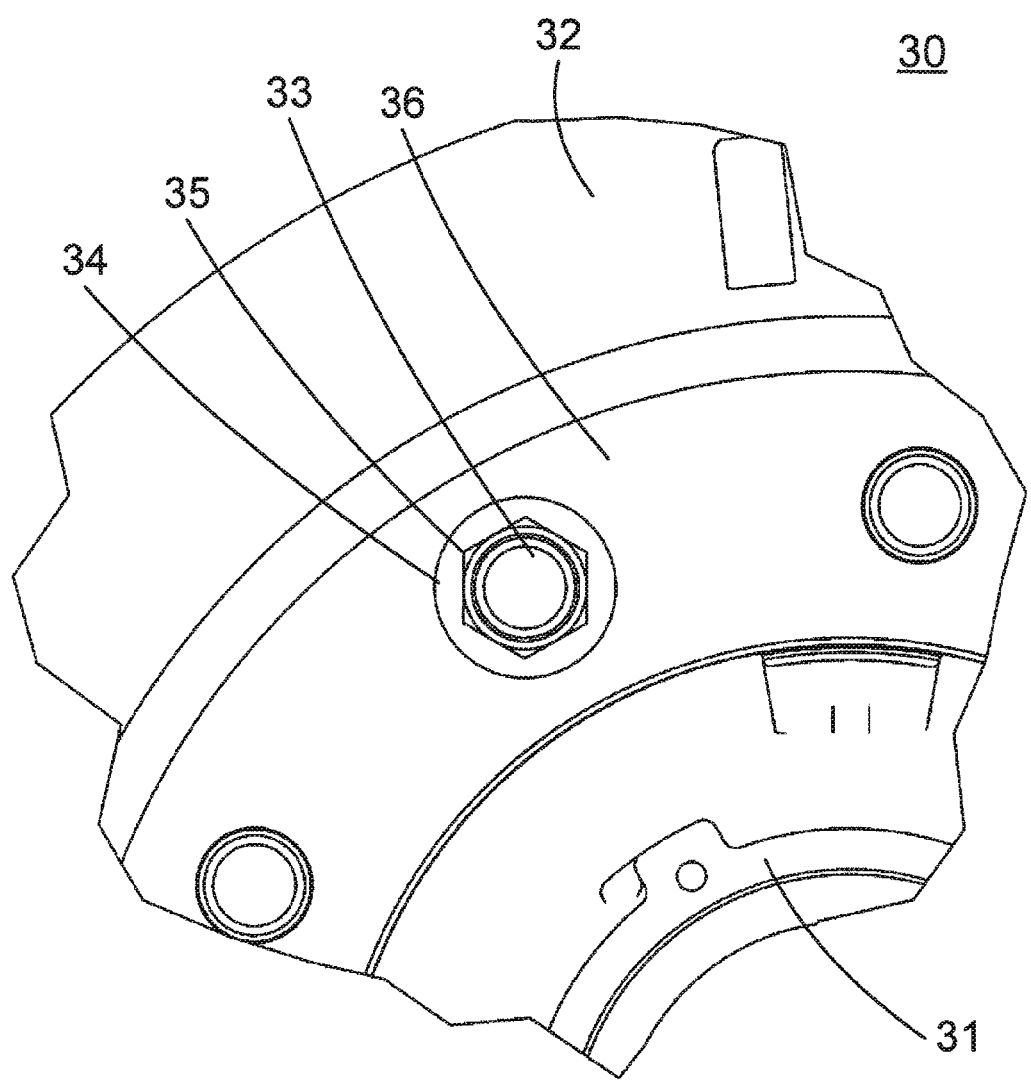
FIG. 5 is an enlarged plan view of the hub and drum assembly of FIG. 3.

FIG. 5 is an enlarged plan view of the hub and drum assembly of FIG. 3.

Referring to FIG. 5, a hub and drum assembly 30 includes a stud 33, a recessed portion 34, a shipping nut 35, and a wheel mating surface 36. As shown in the figure, the recessed portion 34 may be circular in cross-section with a diameter larger than the diameter of the shipping nut 35. The diameter of the recessed portion 34 may be large enough to allow an appropriately-sized socket (not shown) to fit within the recessed portion 34 to allow removal of the shipping nut 35 from the stud 33. This will allow the drum to be removed from a drive train portion for maintenance and/or replacement once the hub and drum assembly is installed on a vehicle or trailer.

The diameter of the recess or counterbore 34 can be less than the flange diameter of the flange nut, so that the flange nut can seat against the face of the drum around and over the shipping nut, if a flange nut installed on the stud without the wheel. Following is an example of diameters of the stud, counterbore, shipping nut and flange nut:

Stud: (Thread Diameter) 22 mm (0.86") (M22×1.5 6H Thread)

Flange Nut: 33 mm (1.29") hex head, flange diameter 46 mm (1.81")

Counterbore: 40 mm (1.56") diameter

Shipping Nut: 27 mm (1.06") hex (M22×1.5 6H thread)×(5 mm)(0.20") deep

Figure 6A:
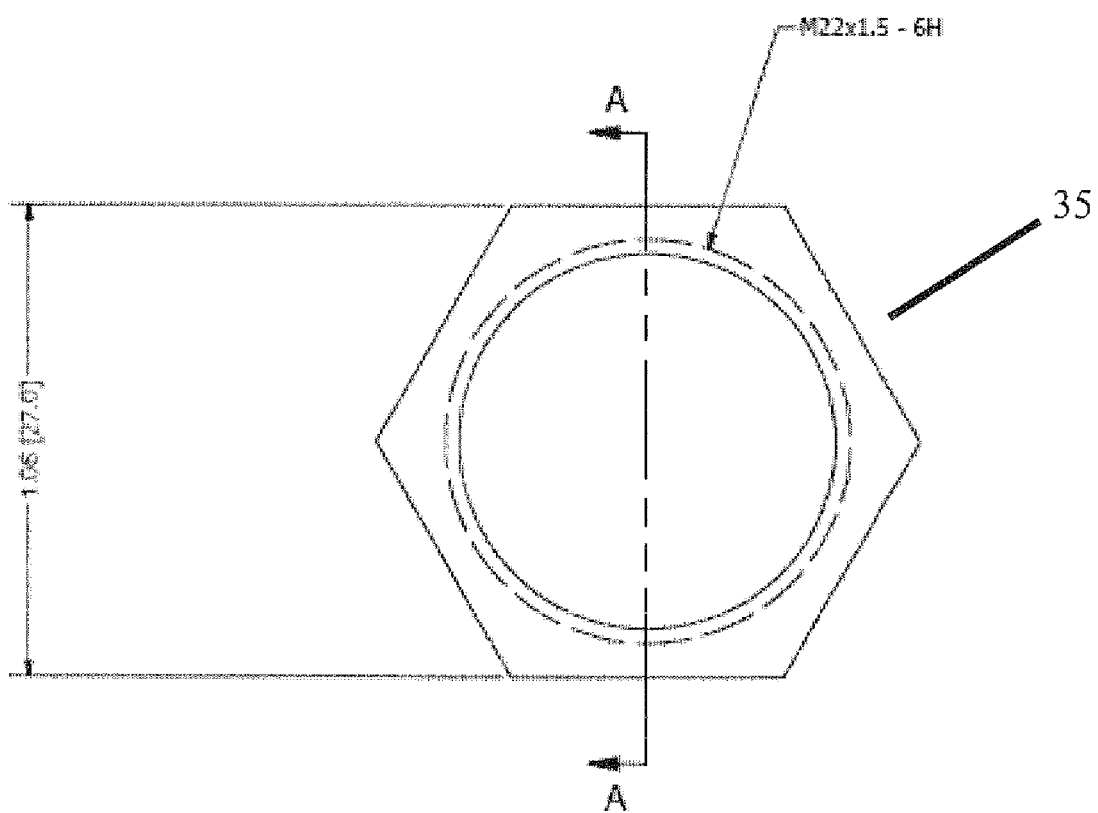
FIGS. 6A and 6B are a plan view and a cross-sectional view, respectively, of the shipping nut of FIG. 3.

FIGS. 6A and B are a plan view and a cross-sectional view of the shipping nut of FIG. 3.

Figure 6B:
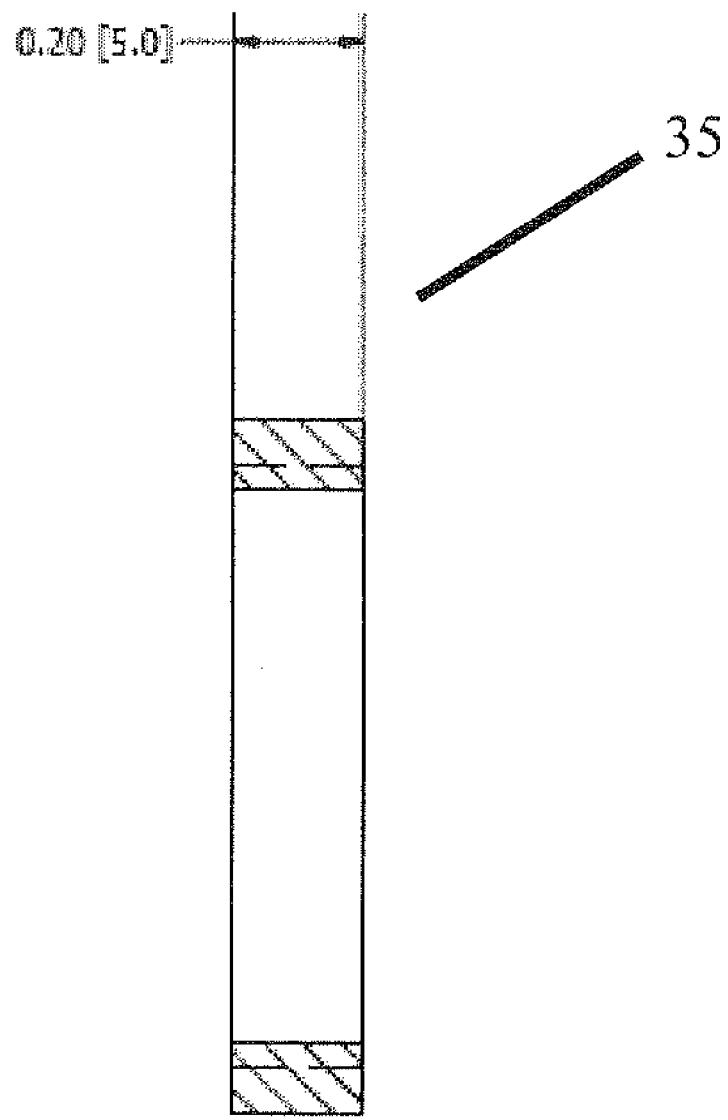

Referring to FIG. 6A, a shipping nut 35 may be hexagonal in cross section with a threaded inner portion sized to engage with a stud. The flat surfaces of the shipping nut 35 are arranged and sized so as to allow manipulation by a standard combination wrench, socket wrench, or the like. For example, the diameter of the shipping nut 35 may be about 27 mm. Referring to FIG. 6B, the shipping nut 35 has a thickness no greater than the depth of a recessed portion or counterbore 34 of a hub and drum assembly 30. For instance, the thickness of the shipping nut 35 may be about 5 mm. The shipping nut 35 may be made from standard materials such as SAE 1035-1045 steel or the like. Further, the shipping nut 35 may have a black phosphate and oil finish, so as to minimize rust and wear over its lifetime.

As exemplarily discussed above with respect to FIG. 3, one embodiment of an apparatus includes a hub 31, a drum 32 in contact with the hub 31, a stud 33 on the hub 31 and extending through a stud hole 38 in the drum 32, a recess 34 disposed in the drum 32 and around the stud hole 38, and a shipping nut 35 threaded on the stud 33 and contained within the recess 34. As also exemplarily shown in FIG. 3, the apparatus may further include one or more additional recesses 34 disposed in the drum 32, one or more additional studs 33 on the hub 31 and extending through one or more additional stud holes 38 in the drum 32, and one or more additional shipping nuts 35 disposed on the additional studs 33.

Figure 7A:
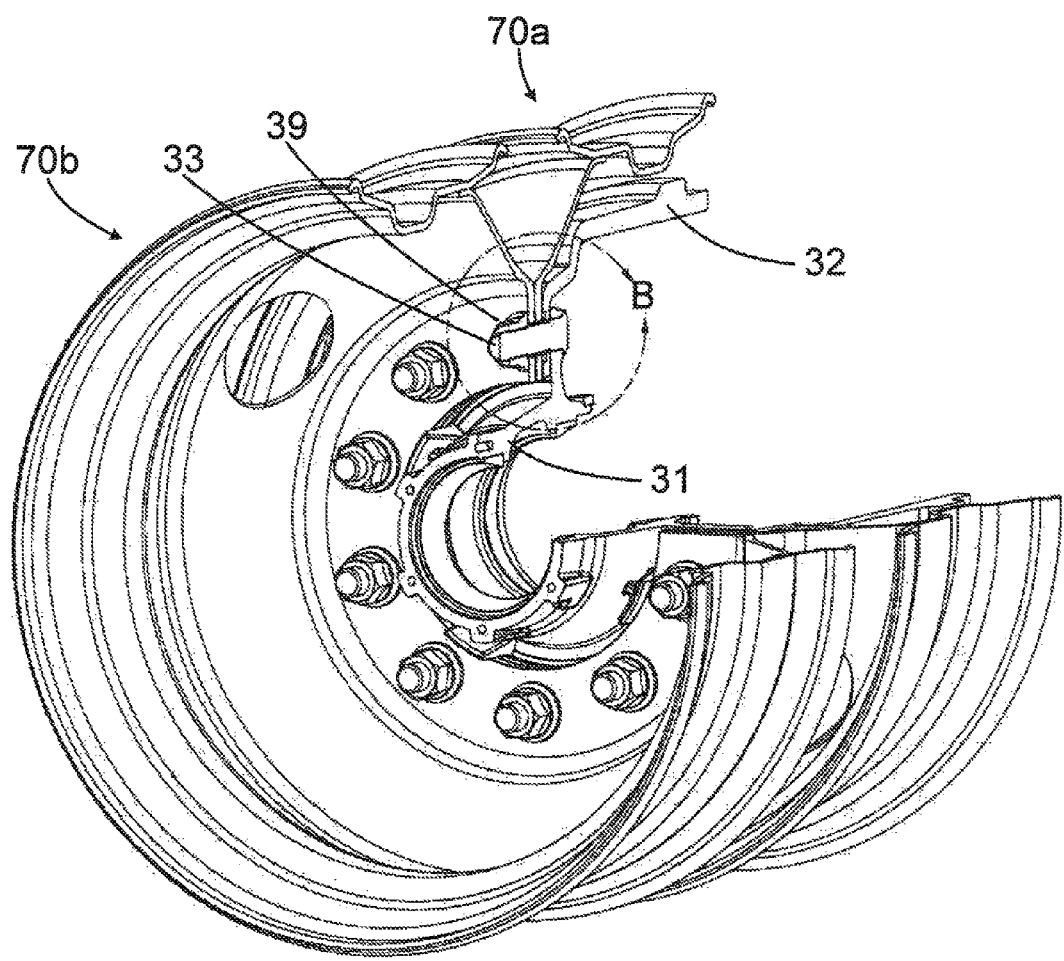
FIG. 7A is a cutaway perspective view of a portion of a drive train including the hub and drum assembly shown in FIG. 3, assembled with flange nuts according to an embodiment of the invention.
Figure 7B:
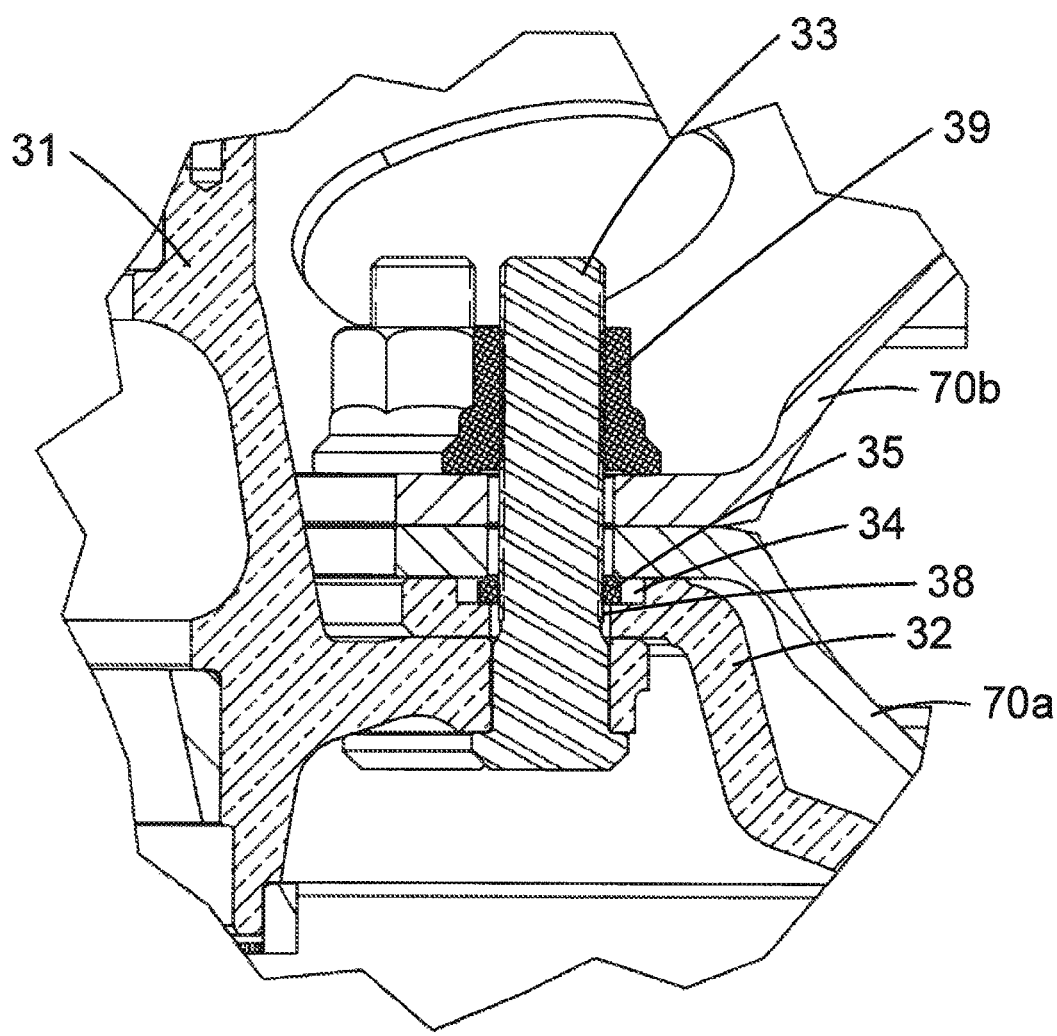
FIG. 7B is a close-up sectional view of the portion of a drive train shown in region B of FIG. 7A.

In one embodiment, the apparatus may further include one or more wheels and one or more flange nuts disposed on the stud and the additional studs, thereby securing the one or more wheels to the drum. For example, and with reference to FIGS. 7A and 7B, an apparatus generally includes a hub 31, a drum 32 in contact with the hub 31, and a stud 33 on the hub 31 and extending through a stud hole 38 in the drum 32, a recess 34 disposed in the drum 32 and around the stud hole 38, and a shipping nut 35 threaded on the stud 33 and contained within the recess 34. As exemplarily illustrated in FIGS. 7A and 7B, the apparatus further includes one or more wheels (e.g., inner dual wheel 70a, outer dual wheel 70b); and one or more flange nuts 39 disposed on more than one of the studs 33, thereby securing the one or more wheels (e.g., inner dual wheel 70a, outer dual wheel 70b) to the drum 32.

Figure 8:
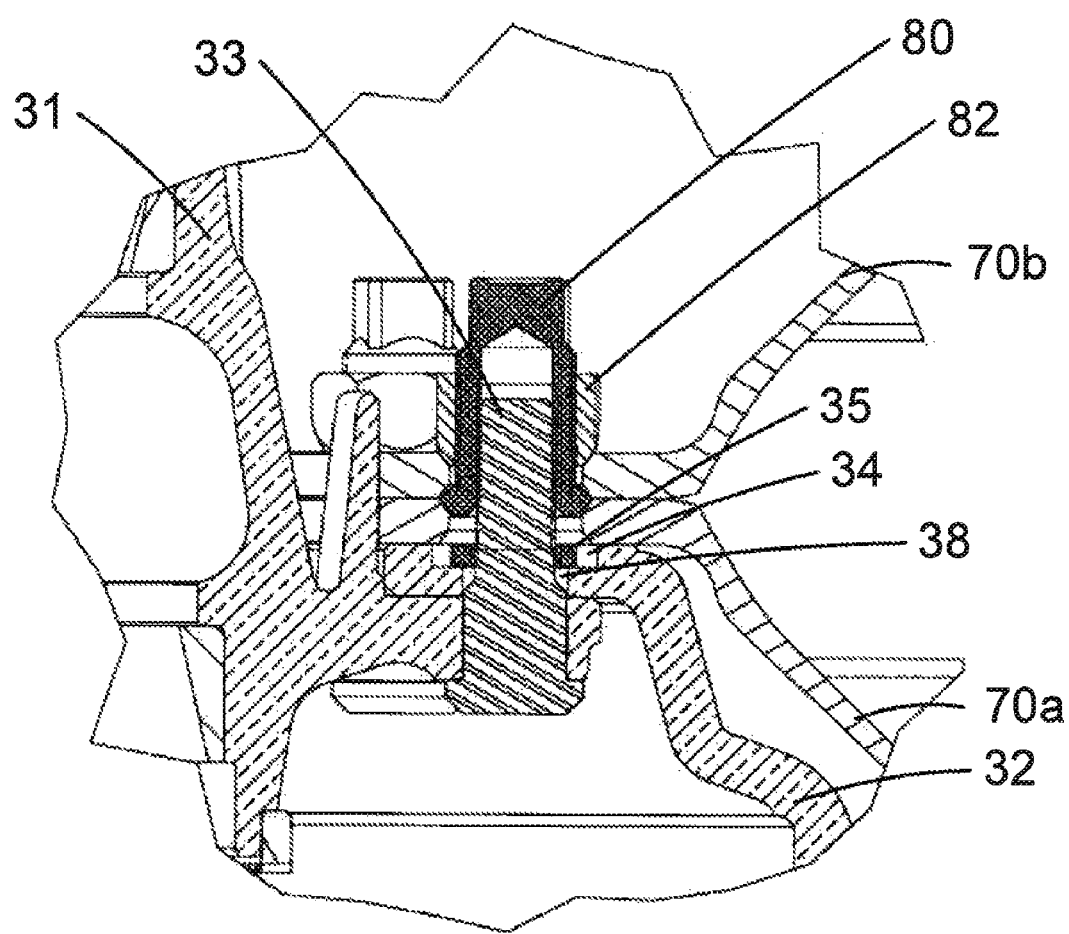
FIG. 8 is a close-up sectional view of a portion of a drive train including the hub and drum assembly shown in FIG. 3, assembled with inner and outer cap nuts according to another embodiment of the invention.

In another embodiment, the apparatus may further include one or more wheels and one or more inner cap nuts and one or more outer cap nuts disposed on the stud and the additional studs, thereby securing the one or more wheels to the drum. For example, and with reference to FIG. 8, instead of the one or more flange nuts 39 shown in FIGS. 7A and 7B, the apparatus may include one or more inner cap nuts 80 and one or more outer cap nuts 82 disposed on more than one of the stud 33, thereby securing the one or more wheels (e.g., inner dual wheel 70a, outer dual wheel 70b) to the drum 32.

According to some embodiments, a method of assembling a drive train portion may include forming a recess in a drum, mounting the drum on a hub, and installing a shipping nut on a stud such that the shipping nut holds the hub and drum securely together. The method may include forming two or more recesses around stud holes in the drum and installing a corresponding number of shipping nuts. In the preferred embodiment, two recesses and two shipping nuts would be used, but other combinations are possible so long as the hub and drum are held securely together. The method may further include attaching one or more wheels to the drum and installing flange nuts to secure the wheels to the drum. Alternatively, the method may include attaching one or more wheels to the drum and installing inner and outer cap nuts to secure the wheels to the drum. The shipping nuts may be left in place when the wheel is mounted on the drum. The method may also include mounting the hub onto a spindle and mounting the spindle on an axle.

According to the embodiments described above, a hub and drum assembly includes a recess and a shipping nut installed in the recess. The hub and drum assembly can be shipped to another location and/or manufacturer where a wheel or wheels can be installed on the hub and drum assembly without removing the shipping nut. In this way, extra labor is not required to disassemble and then reassemble the hub and drum assembly. Not having to disassemble the hub and drum assembly also prevents misalignment from leading to excessive wear and/or vibration in the ultimate application of the assembly. Also, material costs can be reduced because the thin shipping nuts can be less expensive than the flange nuts conventionally used.

The foregoing is illustrative of example embodiments of the invention and is not to be construed as limiting thereof. Although a few example embodiments have been described, those skilled in the art will readily appreciate that many modifications are possible without materially departing from the novel teachings and advantages of the invention. Accordingly, all such modifications are intended to be included within the scope of the invention as defined in the following claims.

The invention claimed is:

1. An apparatus comprising:
a hub;
a drum in contact with the hub;
a stud on the hub, the stud extending through a stud hole in the drum;
a recess disposed in the drum and around the stud hole, the recess having a sidewall and a bottom surface; and
a shipping nut threaded on the stud and contained within the recess, wherein the shipping nut is spaced apart from the sidewall of the recess,
wherein a depth of the recess is larger than a thickness of the shipping nut.

2. The apparatus of claim 1,
wherein at least two recesses are disposed in the drum,
wherein at least two studs are on the hub, each stud extending through a stud hole in the drum, and
wherein a shipping nut is disposed on at least two studs.

3. The apparatus of claim 2, further comprising:
one or more wheels;
a flange nut disposed on each stud, thereby securing the one or more wheels to the hub and the drum.

4. The apparatus of claim 2, further comprising:
one or more wheels;
an inner cap nut and an outer cap nut disposed on each stud, thereby securing the one or more wheels to the hub and the drum.

5. The apparatus of claim 2, wherein the at least two recesses consist of two recesses, the at least two studs consist of ten studs, and a shipping nut is disposed on only two studs.

6. The apparatus of claim 1, wherein the shipping nut comprises steel and the shipping nut has a black phosphate and oil finish.

7. The apparatus of claim 1, wherein the recess is sized to allow a socket to engage the shipping nut within the recess.

8. The apparatus of claim 1, wherein a depth of the recess is about 5.5 millimeters and a thickness of the shipping nut is about 5 millimeters.

9. The apparatus of claim 1, wherein the shipping nut is a flat hex nut.

10. A method comprising:
installing a plurality of studs in a hub;
mounting a drum having a plurality of stud holes onto the hub and a recess around one or more of the stud holes by inserting the each of the plurality of studs into corresponding ones of the plurality of stud holes, wherein the recess includes a sidewall and a bottom surface; and
threading a shipping nut onto one of the plurality of studs such that the hub and the drum are held securely together, wherein the shipping nut is contained within the recess, wherein the shipping nut is spaced apart from the sidewall of the recess and wherein a depth of the recess is larger than a thickness of the shipping nut.

11. The method of claim 10, wherein the drum comprises at least two recesses, the method further comprising threading a shipping nut onto at least two of the studs.

12. The method of claim 11, wherein the at least two recesses consist of two recesses and wherein threading a shipping nut comprises threading a shipping nut onto each stud corresponding to the two recesses.

13. The method of claim 10, further comprising:
installing one or more wheels on the drum;

threading a plurality of flange nuts onto the plurality of studs, thereby securing the wheels to the hub and the drum.

14. The method of claim 10, further comprising:

installing an inner dual wheel on the drum;

threading a plurality of inner cap nuts onto the plurality of studs, thereby securing the inner dual wheel to the drum and the hub;

installing an outer dual wheel on the inner dual wheel; and threading a plurality of outer cap nuts onto the inner cap nuts, thereby securing the outer dual wheel to the inner dual wheel.

15. The method of claim 10, wherein the recess is formed to allow a socket onto the shipping nut.

\* \* \* \* \*